(12) United States Patent
Morinaga (10) Patent No.: US 11,281,063 B2
(45) Date of Patent: Mar. 22, 2022

(54) LIGHT CONTROL SHEET AND LIGHT CONTROL DEVICE

(71) Applicant: TOPPAN PRINTING CO., LTD., Taito-ku (JP)

(72) Inventor: Kaori Morinaga, Taito-ku (JP)

(73) Assignee: TOPPAN PRINTING CO., LTD., Taito-ku (JP)

(*) Notice: Subject to any disclaimer, the term of this patent is extended or adjusted under 35 U.S.C. 154(b) by 0 days.

(21) Appl. No.: 16/925,591

(22) Filed: Jul. 10, 2020

(65) Prior Publication Data

US 2020/0341303 A1    Oct. 29, 2020

Related U.S. Application Data

(63) Continuation of application No. PCT/JP2018/046991, filed on Dec. 20, 2018.

(30) Foreign Application Priority Data

Jan. 12, 2018   (JP) .............................. JP2018-003726

(51) Int. Cl.
*G02F 1/137*     (2006.01)
*G02B 1/14*      (2015.01)
(Continued)

(52) U.S. Cl.
CPC ................ *G02F 1/137* (2013.01); *G02B 1/14* (2015.01); *G02F 1/1334* (2013.01);
(Continued)

(58) Field of Classification Search
None
See application file for complete search history.

(56) References Cited

U.S. PATENT DOCUMENTS 6,171,663 B1 *  1/2001  Hanada ............. G02F 1/133305
                                                        428/1.1
2006/0152649 A1 * 7/2006  Yanagida ............. G02F 1/1334
                                                        349/61

(Continued)

FOREIGN PATENT DOCUMENTS

JP      06-234182 A      8/1994
JP      2003-512647 A    4/2003
(Continued)

OTHER PUBLICATIONS

International Search Report dated Mar. 12, 2019 in PCT/JP2018/046991, filed Dec. 20, 2018 (with English Translation).
(Continued)

*Primary Examiner* — Shan Liu
(74) *Attorney, Agent, or Firm* — Oblon, McClelland, Maier & Neustadt, L.L.P.

(57) ABSTRACT

A light control sheet including a light transmissive resin substrate, and a light control layer formed on the light transmissive resin substrate. The light control layer includes a liquid crystal layer and a pair of electrode layers that sandwich the liquid crystal layer. The light transmissive resin substrate includes a light transmissive resin sheet and a surface-treated layer that has a barrier property, the light transmissive resin sheet has a first surface that faces the light control layer and a second surface opposite to the first surface, and the surface-treated layer is formed on at least one of the first surface and the second surface.

20 Claims, 2 Drawing Sheets

(51) Int. Cl.
  *G02F 1/133* (2006.01)
  *G02F 1/1334* (2006.01)
  *G02F 1/1343* (2006.01)

(52) U.S. Cl.
  CPC ...... *G02F 1/13306* (2013.01); *G02F 1/13439* (2013.01); *G02F 1/134309* (2013.01); *G02F 1/13345* (2021.01); *G02F 2201/503* (2013.01)

(56) References Cited

U.S. PATENT DOCUMENTS

| 2007/0026135 | A1  | 2/2007  | Tahon et al. |
| 2010/0304048 | A1* | 12/2010 | Yukinobu ............... C08J 7/0423 428/1.1 |
| 2017/0369712 | A1* | 12/2017 | Lim ........................ G02B 1/14 |
| 2018/0004032 | A1* | 1/2018  | Jung ................. G02F 1/133305 |
| 2019/0049797 | A1* | 2/2019  | Hosaka .................. C09K 19/56 |

FOREIGN PATENT DOCUMENTS

| JP | 02-208627 A | 8/2009 |
| JP | 2016-110148 A | 6/2016 |
| JP | 2016-207041 A | 12/2016 |
| JP | 2017-223950 A | 12/2017 |
| WO | WO 2009/102079 A1 | 8/2009 |
| WO | WO2010/100807 A1 | 9/2010 |
| WO | WO 2016/072498 A1 | 5/2016 |

OTHER PUBLICATIONS

Extended European Search Report dated Jan. 29, 2021 in corresponding European Patent Application No. 18900272.8, 10 pages.

* cited by examiner

LIGHT CONTROL SHEET AND LIGHT CONTROL DEVICE

CROSS-REFERENCE TO RELATED APPLICATIONS

The present application is a continuation of International Application No. PCT/JP2018/046991, filed Dec. 20, 2018, which is based upon and claims the benefits of priority to Japanese Application No. JP2018-003726, filed Jan. 12, 2018. The entire contents of all of the above applications are incorporated herein by reference.

BACKGROUND OF THE INVENTION

Field of the Invention

The present invention relates to a light control sheet and a light control device including the light control sheet.

Discussion of the Background

Light control sheets include a pair of light transmissive resin sheets and a liquid crystal layer. The liquid crystal layer is positioned between the pair of light transmissive resin sheets. In the light control sheets, when a voltage applied to the liquid crystal layer is changed, an alignment direction of liquid crystal molecules is changed. Types of light control sheets include a normal type having no alignment film and a reverse type having an alignment film. In the normal type, a transmittance of the liquid crystal layer is increased by applying a drive voltage to the liquid crystal layer, and the transmittance of the liquid crystal layer is reduced by stopping the application of the drive voltage to the liquid crystal layer. In the reverse type, a transmittance of the liquid crystal layer is reduced by applying a drive voltage to the liquid crystal layer, and the transmittance of the liquid crystal layer is increased by stopping the application of the drive voltage to the liquid crystal layer (see, for example, WO 2016/72498 A).

Objects to which the light control sheets are applied may include interior construction materials such as partitions, screens for displaying images, and the like. The light control sheets are used in an indoor environment where temperature and humidity are controlled. The light transmissive resin sheet of the light control sheets assumed to be used in indoor environment is, for example, a polyethylene terephthalate sheet (PET sheet) which has stable chemical properties in the indoor environment.

SUMMARY OF THE INVENTION

According to an aspect of the present invention, a light control sheet includes a light transmissive resin substrate, and a light control layer formed on the light transmissive resin substrate. The light control layer includes a liquid crystal layer and a pair of electrode layers that sandwich the liquid crystal layer. The light transmissive resin substrate includes a light transmissive resin sheet and a surface-treated layer that has a barrier property, the light transmissive resin sheet has a first surface that faces the light control layer and a second surface opposite to the first surface, and the surface-treated layer is formed on at least one of the first surface and the second surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

An embodiment of a light control sheet and a light control device will be described with reference to FIGS. 1 to 4. A structure of the light control device, a layer structure of the light control sheet, a structure of a light control layer, and a layer structure of a light transmissive resin substrate will be sequentially described below.

<Structure of Light Control Device>

Figure 1:
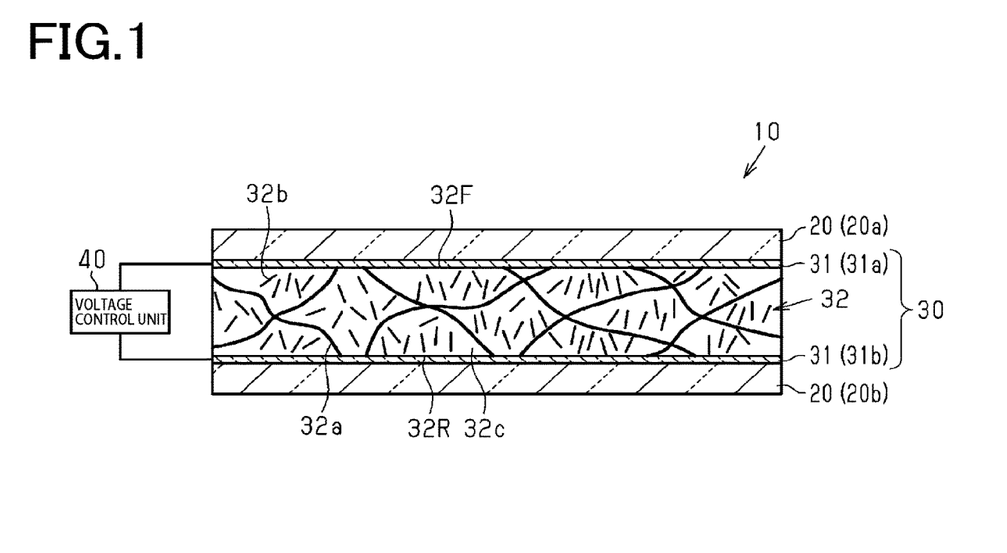
FIG. 1 shows a structure of a light control device of a normal type together with a cross-sectional structure of a light control sheet.
Figure 2:
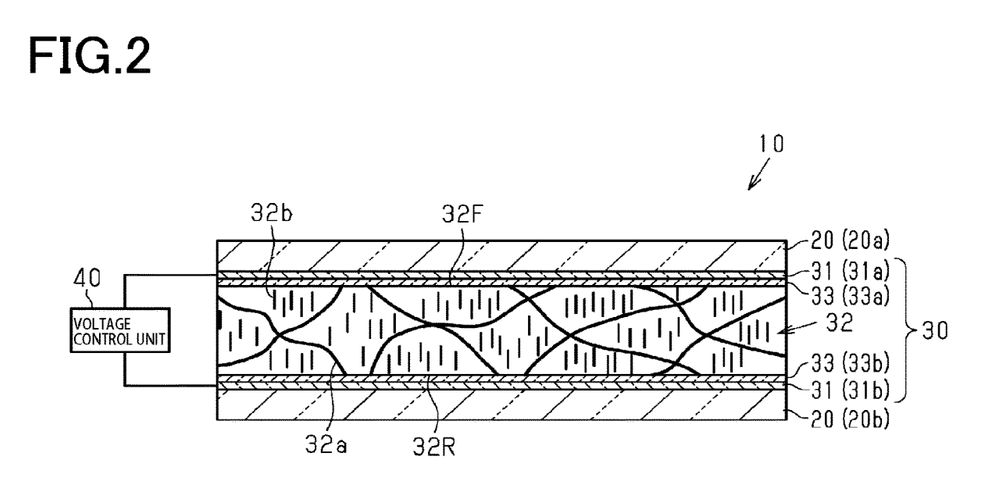
FIG. 2 shows a structure of a light control device of a reverse type together with a cross-sectional structure of a light control sheet.

Types of light control devices, i.e., a normal type and a reverse type will be described with reference to FIGS. 1 and 2. In FIGS. 1 and 2, for convenience of illustration, a thickness of the light control layer, a thickness of the light transmissive resin substrate, a size of a domain, a size of a liquid crystal molecule, and the like are exaggerated.

As shown in FIG. 1, a light control device includes a light control sheet 10 and a voltage control unit 40 connected to the light control sheet 10. The light control sheet 10 changes a transmittance of the light control sheet 10 by switching an alignment direction of liquid crystal molecules. The voltage control unit 40 controls application of a drive voltage for switching the alignment direction of the liquid crystal molecules.

<Structure of Light Control Sheet: Normal Type>

The light control sheet 10 includes a pair of light transmissive resin substrates 20 and a light control layer 30 sandwiched by the pair of light transmissive resin substrates 20. The light control layer 30 includes a pair of electrode layers 31 and a liquid crystal layer 32 sandwiched by the pair of electrode layers 31. The liquid crystal layer 32 is formed of a polymer network liquid crystal (PNLC). The liquid crystal layer 32 includes a polymer network 32a and a liquid crystal composition 32b.

The polymer network 32a has a three-dimensional mesh pattern having a plurality of domains 32c. Each domain 32c is a void defined by the polymer network 32a. The domain 32c of the polymer network 32a is filled with the liquid crystal composition 32b.

When a magnitude of a voltage applied to the liquid crystal layer 32 is changed, a state of the liquid crystal layer 32 is changed between a first state in which the liquid crystal layer 32 scatters light and a second state in which light transmits the liquid crystal layer 32. In the first state, the liquid crystal layer 32 scatters light incident from a front surface 32F and light incident from a rear surface 32R, and the scattered light emerges from the front surface 32F and the rear surface 32R.

For example, when no drive voltage is applied to the liquid crystal layer 32, the liquid crystal layer 32 is in the first state. When no drive voltage is applied to the liquid crystal layer 32, the liquid crystal compositions 32b are randomly arranged in the domains 32c. Accordingly, from the front surface 32F toward the rear surface 32R and from the rear surface 32R toward the front surface 32F, light is less likely to be transmitted through the liquid crystal layer 32. As a result, as compared with the case where a drive voltage is applied to the liquid crystal layer 32, the liquid crystal layer 32 has a high haze value.

On the other hand, when a drive voltage is applied to the liquid crystal layer 32, the liquid crystal layer 32 is in the second state. When a drive voltage is applied to the liquid crystal layer 32, the liquid crystal compositions 32b are arranged so that a longitudinal direction of the liquid crystal compositions 32b is in a direction that intersects the front surface 32F and the rear surface 32R, for example, in a normal direction of the front surface 32F and the rear surface 32R. Accordingly, from the front surface 32F toward the rear surface 32R and from the rear surface 32R toward the front surface 32F, light is more likely to be transmitted through the liquid crystal layer 32. As a result, as compared with the case where no drive voltage is applied to the liquid crystal layer 32, the liquid crystal layer 32 has a low haze value.

Thus, in the normal type, when no drive voltage is applied to the liquid crystal layer 32, the liquid crystal layer 32 has a relatively high haze value, and when a voltage is applied to the liquid crystal layer 32, the liquid crystal layer 32 has a relatively low haze value.

As the haze value, the liquid crystal layer 32 may take only a first value corresponding to the first state and a second value corresponding to the second state. Alternatively, as the haze value, in addition to the first value and the second value, the liquid crystal layer 32 may also take an intermediate value between the first value and the second value according to a magnitude of the drive voltage applied to the liquid crystal layer 32.

When the liquid crystal layer 32 is in the first state, the liquid crystal layer 32 preferably has a total light transmittance of 10% or less and a haze value of 80% or more. When the liquid crystal layer 32 is in the second state, the liquid crystal layer 32 preferably has a total light transmittance of 80% or more and a haze value of 10% or less. The total light transmittance of the layers can be measured by a method in accordance with JIS K 7361-1 (ISO 13468-1). Furthermore, the haze value of the layers can be measured by a method in accordance with JIS K 7136 (ISO 14782).

The pair of electrode layers 31 allow light to be transmitted therethrough and apply a drive voltage to the liquid crystal layer 32. The electrode layers 31 are located one layer each on the respective front surface 32F and rear surface 32R of the liquid crystal layer 32. Of the pair of electrode layers 31, the electrode layer 31 located on the front surface 32F of the liquid crystal layer 32 is a first electrode layer 31a, and the electrode layer 31 located on the rear surface 32R of the liquid crystal layer 32 is a second electrode layer 31b.

The electrode layers 31 each preferably have a total light transmittance higher than the total light transmittance of the liquid crystal layer 32 when the liquid crystal layer 32 is in the second state. Accordingly, the total light transmittance of the light control sheet 10 is approximately determined by the total light transmittance of the liquid crystal layer 32.

The pair of light transmissive resin substrates 20 are composed of a first light transmissive resin substrate 20a and a second light transmissive resin substrate 20b. The first light transmissive resin substrate 20a is bonded to a surface of the first electrode layer 31a opposite to that contacting the front surface 32F of the liquid crystal layer 32. The second light transmissive resin substrate 20b is bonded to a surface of the second electrode layer 31b opposite to that contacting the rear surface 32R of the liquid crystal layer 32.

The light transmissive resin substrates 20a and 20b each preferably have a total light transmittance higher than the total light transmittance of the liquid crystal layer 32 when the liquid crystal layer 32 is in the second state. Accordingly, the total light transmittance of the light control sheet 10 is approximately determined by the total light transmittance of the liquid crystal layer 32.

The light transmissive resin substrates 20a and 20b each include a light transmissive resin sheet having flexibility. The light transmissive resin substrates 20a and 20b having flexibility allows the light control sheet 10 to have flexibility. Besides laminating the light control sheet 10 on a flat member made of glass or the like, the light control sheet 10 can also be applied to a member having a curved surface. Furthermore, the light control sheet 10 can be stored in a roll state. Thus, the light control sheet 10 having flexibility increases the degree of freedom in handling.

<Structure of Light Control Sheet: Reverse Type>

As shown in FIG. 2, the light control sheet 10 includes the pair of light transmissive resin substrates 20 and the light control layer 30 sandwiched by the pair of light transmissive resin substrates 20. The light control layer 30 includes the pair of electrode layers 31, a pair of alignment layers 33 sandwiched by the pair of electrode layers 31, and the liquid crystal layer 32 sandwiched by the pair of alignment layers 33. One of the pair of alignment layers 33 is a first alignment layer 33a located between the front surface 32F of the liquid crystal layer 32 and the first electrode layer 31a. The other of the pair of alignment layers 33 is a second alignment layer 33b located between the rear surface 32R of the liquid crystal layer 32 and the second electrode layer 31b.

The alignment layers 33a and 33b are, for example, vertical alignment films, and align the liquid crystal compositions 32b so that the liquid crystal molecules extend in a normal direction of planes of the alignment layers 33a and 33b. Thus, when no drive voltage is applied to the liquid crystal layer 32, the liquid crystal layer 32 is in the second state. That is, in the domains, the liquid crystal compositions 32b are arranged so that the liquid crystal molecules extend in a normal direction of the planes of the alignment layers 33a and 33b. Accordingly, from the front surface 32F toward the rear surface 32R and from the rear surface 32R toward the front surface 32F, light is more likely to be transmitted through the liquid crystal layer 32. As a result, as compared with the case where a drive voltage is applied to the liquid crystal layer 32, the liquid crystal layer 32 has a low haze value. On the other hand, when a drive voltage is applied to the liquid crystal layer 32, the liquid crystal layer 32 is in the first state. That is, in the domains 32c, the liquid crystal compositions 32b are arranged so that the liquid crystal molecules extend in random directions. Accordingly, from the front surface 32F toward the rear surface 32R and from the rear surface 32R toward the front surface 32F, light is less likely to be transmitted through the liquid crystal layer 32. As a result, as compared with the case where no voltage is applied to the liquid crystal layer 32, the liquid crystal layer 32 has a high haze value.

Thus, in the reverse type, when a voltage is applied to the liquid crystal layer 32, the liquid crystal layer 32 has a relatively high haze value, and when no voltage is applied to the liquid crystal layer 32, the liquid crystal layer 32 has a relatively low haze value.

<Structure of Light Control Layer 30>

A structure of the light control layer 30 will be described focusing on a material for forming the light control layer 30.

A resin for forming the polymer network 32a is, for example, any of a thermosetting resin and an ultraviolet curable resin. The resin for forming the polymer network 32a is formed of, for example, a monomer having a polar group or a bifunctional monomer. The monomer having a polar group and the bifunctional monomer are polymerized by being heated or irradiated with ultraviolet light. The monomer having a polar group has, for example, at least one polar group selected from the group consisting of a hydroxy group, a carboxy group, and a phosphate group.

The liquid crystal compositions 32b are, for example, any of liquid crystal molecules constituting a nematic liquid crystal, liquid crystal molecules constituting a smectic liquid crystal, and liquid crystal molecules constituting a cholesteric liquid crystal. As a component other than the liquid crystal molecules, the liquid crystal composition 32b may contain a dichroic dye, an ultraviolet absorber, and the like.

When the resin for forming the polymer network 32a is an ultraviolet curable resin, the liquid crystal layer 32 can be manufactured by the following manufacturing method.

First, a composition containing the liquid crystal composition 32b and a UV-polymerizable compound is enclosed between the pair of light transmissive resin substrates 20 bonded to the electrode layers 31. Subsequently, the enclosed composition is irradiated with ultraviolet light, for example, from a side of the first electrode layer 31a facing away from the composition and a side of the second electrode layer 31b facing away from the composition. Accordingly, the UV-polymerizable compound is photopolymerized to generate a polymer, and the polymer is crosslinked to generate a large number of fine domains 32c. As a result, the polymer network 32a is formed.

By the method in which the enclosed composition is simultaneously irradiated with light from both sides of the enclosed composition, in a thickness direction of the polymer network 32a, variation in polymerization speed of the UV-polymerizable compound can be reduced. As a result, in both of a surface direction of the electrode layers 31 and a thickness direction of the liquid crystal layer 32, variation in size of the domains 32c and variation in shape of the domains 32c can be reduced.

The electrode layer 31 is a conductive film having light transmissivity. A material for forming the electrode layer 31 is, for example, a conductive polymer having light transmissivity. The conductive polymer is, for example, polythiophene, polyacetylene, polyaniline, or polypyrrole. An example of the polythiophene polymer is PEDOT (polyethylene dioxythiophene). Furthermore, the material for forming the electrode layer 31 is, for example, a metal oxide having light transmissivity and conductivity. The metal oxide is, for example, ATO ($SnO_2$: Sb), FTO ($SnO_2$: F), ITO ($In_2O_3$: Sn), AZO (ZnO: Al), or GZO (ZnO: Ga).

<Layer Structure of Light Transmissive Resin Substrate 20>

A layer structure of the light transmissive resin substrate 20 will be described with reference to FIGS. 3 and 4. As the layer structure of the light transmissive resin substrate 20, a first layer structure and a second layer structure will be described below.

<First Layer Structure>

Figure 3:
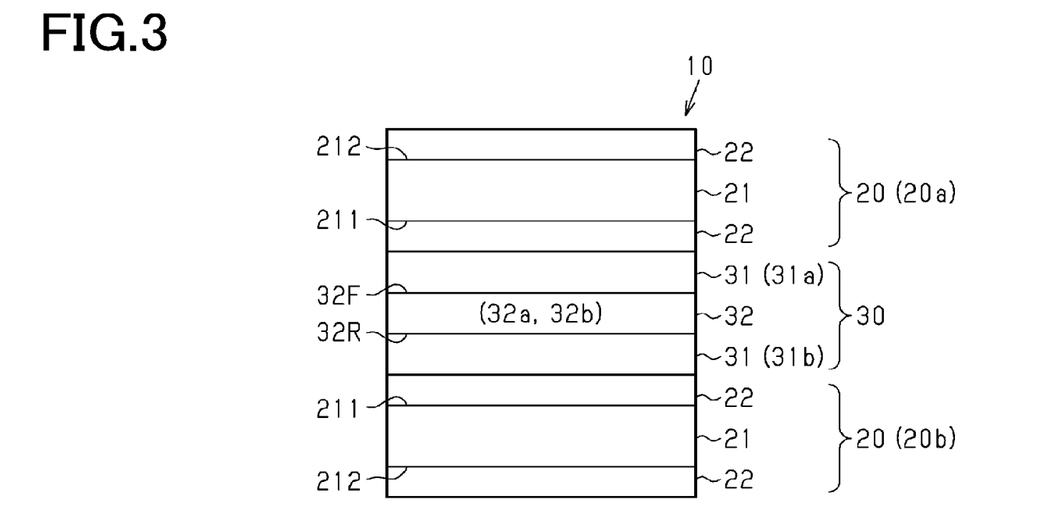
FIG. 3 shows a cross-sectional structure of a light control sheet including a light transmissive resin substrate having a first layer structure.

As shown in FIG. 3, the light transmissive resin substrates 20 include light transmissive resin sheets 21 and surface-treated layers 22. The surface-treated layers 22 are located one layer each on a first surface 211 and a second surface 212 of the light transmissive resin sheet 21, respectively. The surface-treated layer 22 may also be located on only one of either the first surface 211 or the second surface 212.

The light transmissive resin sheet 21 has light transmissivity and flexibility. A material for forming the light transmissive resin sheet 21 is, for example, one selected from the group consisting of PET, polyethylene (PE), polycarbonate (PC), polyethylene naphthalate (PEN), and polyimide (PI).

From the viewpoint of higher resistance in a high-temperature and high-humidity environment, the light transmissive resin sheet 21 preferably has a glass transition temperature of 85° C. or more. The material for forming the light transmissive resin sheet 21 is preferably polycarbonate, polyethylene naphthalate, or polyimide. Polyethylene has a glass transition temperature of approximately −125° C., and polyethylene terephthalate has a glass transition temperature of approximately 69° C. On the other hand, polyethylene naphthalate has a glass transition temperature of approximately 80° C., polycarbonate has a glass transition temperature of approximately 150° C., and polyimide has a glass transition temperature of approximately 275° C. The high-temperature and high-humidity environment refers to an environment where a temperature is 85° C. and a relative humidity (RH) is 85%.

The light transmissive resin sheet 21 has a thickness, for example, in the range of 50 μm or more and 200 μm or less. When the light transmissive resin sheet 21 has a thickness of 50 μm or more, during manufacture of the light control sheet 10, occurrence of wrinkles or the like of the light transmissive resin sheet 21 can be prevented. Furthermore, when the light transmissive resin sheet 21 has a thickness of 200 μm or less, the light transmissivity of the light control sheet 10 is easily ensured.

In the light transmissive resin sheet 21, the content of low-molecular weight impurities such as oligomers is preferably low. When the content of low-molecular weight impurities is lower, in a high-temperature and high-humidity environment, low-molecular weight impurities are less likely to be generated in the light transmissive resin sheet 21 and the low-molecular weight impurities are less likely to move to the light control layer 30.

The surface-treated layer 22 is at least one of a hard coat layer and a diffusion prevention layer. The single surface-treated layer 22 is composed of one or more layers. The single surface-treated layer 22 may be composed of, for example, only a hard coat layer, or may be composed of only a diffusion prevention layer. The single surface-treated layer 22 may be composed of, for example, a hard coat layer and an adhesive layer, or may be composed of a diffusion prevention layer and an adhesive layer. The single surface-treated layer 22 may be a combination of a hard coat layer and a diffusion prevention layer. The light transmissive resin substrate 20 may include different types of hard coat layers on the first surface 211 and the second surface 212, or may include different types of diffusion prevention layers on the first surface 211 and the second surface 212. The light transmissive resin substrate 20 may include a diffusion prevention layer on the first surface 211 and include a hard coat layer on the second surface 212. Alternatively, the light transmissive resin substrate 20 may include a hard coat layer on the first surface 211 and include a diffusion prevention layer on the second surface 212.

In a pencil hardness test in accordance with JIS K5600-5-4 (1999), the hard coat layer has higher hardness than the light transmissive resin sheet 21. The hard coat layer has a barrier property for preventing diffusion of water molecules to the light control layer 30 and diffusion of atmospheric air to the light control layer 30. Furthermore, the hard coat layer has a barrier property for preventing diffusion of water molecules to the light transmissive resin sheet 21 and diffusion of atmospheric air to the light transmissive resin sheet 21. The hard coat layer preferably has a higher glass transition temperature (Tg) than the light transmissive resin sheet 21.

The hard coat layer is, for example, at least one selected from the group consisting of a cured product of a photocurable resin, a cured product of a thermosetting resin, and an inorganic oxide film. When the hard coat layer is formed of a cured product of a photocurable resin or a cured product of a thermosetting resin, the hard coat layer can be formed by a method in which energy is supplied to the curable resin located in the light transmissive resin sheet. A single hard coat layer is composed of one or more layers. The single hard coat layer may be composed of, for example, only a cured product of a photocurable resin, or may be a combination of a cured product of a photocurable resin and an inorganic oxide film. Alternatively, the single hard coat layer may be a combination of a cured product of a photocurable resin or a cured product of a thermosetting resin and an inorganic oxide film.

The photocurable resin for forming the hard coat layer is, for example, an acrylate resin, an acrylic resin, a polyester resin, or an epoxy resin. A monomer or prepolymer for forming the acrylate resin is, for example, a polyester acrylate monomer or prepolymer, or an epoxy acrylate monomer or prepolymer. The thermosetting resin for forming the hard coat layer is, for example, a polycarbonate resin or a polyimide resin. For obtaining a high barrier property, the monomer or prepolymer for forming the hard coat layer preferably has two or more unsaturated double bonds.

The hard coat layer has a thickness, for example, in the range of 0.2 µm or more and 10 µm or less. When the hard coat layer has a thickness of 0.1 µm or more, formation of pinholes or the like in the hard coat layer can be prevented and thus a sufficient barrier property can be obtained. When the hard coat layer has a thickness 10 µm or less, a reduction in transmittance due to the addition of the hard coat layer can be prevented.

In the case where the hard coat layer is provided on the first surface 211, in a high-temperature and high-humidity environment, diffusion of the low-molecular weight impurities from the light transmissive resin sheet 21 to the light control layer 30 can be prevented. In the case where the hard coat layer is provided on the second surface 212, in a high-temperature and high-humidity environment, hydrolysis in the light transmissive resin sheet 21 can be prevented, and thus generation itself of the low-molecular weight impurities due to hydrolysis can be prevented.

The hard coat layer may be in contact with the electrode layer 31, or may be bonded to the electrode layer 31 via an adhesion-enhancing layer. A resin for forming the adhesion-enhancing layer contains, for example, at least one or more polymers selected from the group consisting of acrylic polymer, polyester, polyurethane, polyvinyl alcohol, polyester acrylate, urethane acrylate, and epoxy acrylate.

The diffusion prevention layer includes a polymer network for preventing diffusion of the low-molecular weight impurities, and thus has a barrier property for preventing diffusion of the low-molecular weight impurities. The low-molecular weight impurities such as oligomers inevitably occur in the light transmissive resin sheet 21, for example, during production of the light transmissive resin sheet 21. Furthermore, when the light transmissive resin sheet 21 is placed in a high-temperature and high-humidity environment, the low-molecular weight impurities are generated in the light transmissive resin sheet 21.

The diffusion prevention layer is, for example, at least one selected from the group consisting of a cured product of a photocurable resin, a cured product of a thermosetting resin, and an inorganic oxide film. A single diffusion prevention layer is composed of one or more layers. The single diffusion prevention layer may be composed of, for example, only a cured product of a photocurable resin, or may be a combination of a cured product of a photocurable resin and an inorganic oxide film. Alternatively, the single diffusion prevention layer may be a combination of a cured product of a photocurable resin or a cured product of a thermosetting resin and an inorganic oxide film.

A material for forming the diffusion prevention layer is a crosslinked product of a composition having a functional group forming a crosslinked structure. The composition contains, for example, one or more polymers selected from the group consisting of acrylic polymer, polyester, polyurethane, polyvinyl alcohol, polyester acrylate, polyurethane acrylate, and polyepoxy acrylate. Thus, diffusion of the low-molecular weight impurities to the light control layer 30 is easily prevented by the diffusion prevention layer. Furthermore, the diffusion prevention layer can have a function of bonding the light control layer 30 to the light transmissive resin sheet 21, thereby increasing adhesion between the light control layer 30 and the light transmissive resin sheet 21.

The light control sheet 10 may include an adhesion-enhancing layer for bonding the light transmissive resin sheet 21 to the light control layer 30. In this case, the material for forming the diffusion prevention layer may be, for example, the same as a material for forming the adhesion-enhancing layer. The adhesion-enhancing layer typically has a thickness in the range of 10 nm or more and 100 nm or less. When the adhesion-enhancing layer and the diffusion prevention layer are formed of the same material, a total thickness of the adhesion-enhancing layer and the diffusion prevention layer is, for example, in the range of 1 µm or more and 10 µm or less.

With regard to a conventional structure in which the light transmissive resin sheet 21 composed of a polyethylene terephthalate sheet is bonded to the light control layer 30 by using an adhesion-enhancing layer, the inventors have conducted extensive research on the state of the light control sheet 10 in a high-temperature and high-humidity environment. Then, the inventors have found that in a high-temperature and high-humidity environment, low-molecular weight impurities such as oligomers are diffused from the light transmissive resin sheet 21 and deposited in the liquid crystal layer 32, resulting in disturbance of the alignment of the liquid crystal molecules. As described above, in the light control sheet 10 including the surface-treated layer 22 having a barrier property, the surface-treated layer 22 prevents diffusion of the low-molecular weight impurities and generation of the low-molecular weight impurities in the light transmissive resin sheet 21. As a result, reliability of alignment control in a high-temperature and high-humidity environment can be increased.

<Second Layer Structure>

Figure 4:
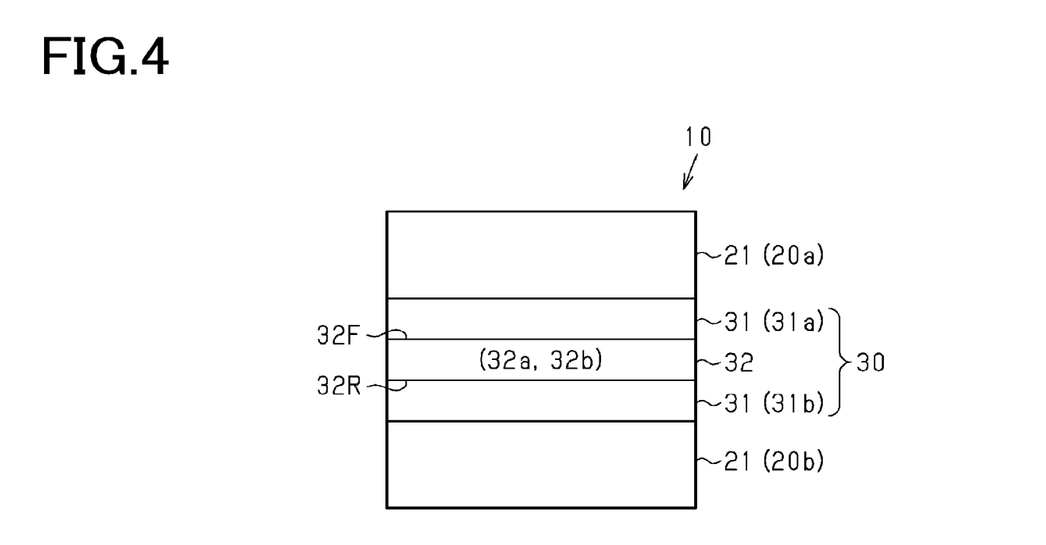
FIG. 4 shows a cross-sectional structure of a light control sheet including a light transmissive resin substrate having a second layer structure.

As shown in FIG. 4, the light control sheet 10 includes the light transmissive resin sheet 21 as the first light transmissive resin substrate 20a and includes the light transmissive resin sheet 21 as the second light transmissive resin substrate 20b. That is, in the second layer structure, the light transmissive resin substrates 20 are each composed of the single light transmissive resin sheet 21.

The light transmissive resin sheet 21 of the second layer structure has light transmissivity and flexibility. A material for forming the light transmissive resin sheet 21 is a compound selected from the group consisting of polyethylene naphthalate and polyimide. That is, the light transmissive resin sheet 21 is a polyethylene naphthalate sheet or a polyimide sheet. The polyethylene naphthalate sheet and the polyimide sheet have higher hydrolysis resistance than a PET sheet. Thus, the low-molecular weight impurities moving from the light transmissive resin sheet 21 can be easily reduced. The light transmissive resin sheet 21 may be in contact with the electrode layer 31, or may be bonded to the electrode layer 31 via an adhesion-enhancing layer.

An electrode structure in which the light transmissive resin sheet 21 is bonded to the electrode layer 31 satisfies <Condition 1> below. Furthermore, the electrode structure preferably satisfies <Condition 2> below.

<Condition 1> In the electrode structure, an amount of increase in haze value after the electrode structure is kept for 100 hours under conditions of 85° C. and 85% RH is less than 2%.

<Condition 2> In the light transmissive resin sheet 21, an amount of increase in haze value after the light transmissive resin sheet 21 is kept for 100 hours under conditions of 85° C. and 85% RH is less than 2%.

While conducting extensive research on the state of the light control sheet 10 having a conventional structure in a high-temperature and high-humidity environment, the inventors have found associations between movement of the low-molecular weight impurities and the amount of increase in the haze value of the electrode structure. Specifically, the inventors have found that when in the electrode structure, the amount of increase in the haze value is a high value such as 3%, defects in alignment control due to the movement of the low-molecular weight impurities are observed, but when the amount of increase in the haze value is less than 2%, reliability of alignment control due to the movement of the low-molecular weight impurities can be ensured. As described above, when the electrode structure is the light control sheet 10 satisfying <Condition 1>, diffusion and generation of the low-molecular weight impurities can be prevented. Consequently, reliability of alignment control in a high-temperature and high-humidity environment can be increased. Furthermore, as described above, in the case of the light control sheet 10 in which the light transmissive resin sheet 21 alone satisfies <Condition 2>, the above effect can be more reliably achieved. Furthermore, in the case of the light control sheet 10 satisfying <Condition 2>, since the amount of increase in the haze value of the light transmissive resin sheet 21 alone is less than 2%, it is possible to prevent the electrode layers 31 from being separately forced to have a function of preventing diffusion of the low-molecular weight impurities.

Examples 1, 2

The light control sheet 10 of the normal type of Example 1 including the following layers was obtained. Furthermore, the pair of alignment layers 33 were added to the light control sheet 10 of Example 1 to obtain the light control sheet 10 of the reverse type of Example 2.

Layer structure of light transmissive resin substrate 20:
First layer structure
Light transmissive resin sheet 21: PET sheet (manufactured by Toyobo Co., Ltd., A4300)
Thickness of light transmissive resin sheet 21: 50 μm
Surface-treated layer 22: Hard coat layer (acrylic resin)
Thickness of surface-treated layer 22: 1.0 μm
Position of surface-treated layer 22: First surface 211 and second surface 212
Electrode layers 31: PEDOT
Thickness of electrode layers 31: 0.3 μm Examples 3, 4

The thickness of the surface-treated layer 22 of Example 1 was changed to 1.5 μm and the other components were prepared in the same manner as Example 1 to obtain the light control sheet 10 of Example 3. Furthermore, as in Example 2, the pair of alignment layers 33 were added to the light control sheet 10 of Example 3 to obtain the light control sheet 10 of the reverse type of Example 4.

Examples 5, 6

The thickness of the surface-treated layer 22 of Example 1 was changed to 3.0 μm and the other components were prepared in the same manner as Example 1 to obtain the light control sheet 10 of Example 5. Furthermore, as in Example 2, the pair of alignment layers 33 were added to the light control sheet 10 of Example 5 to obtain the light control sheet 10 of the reverse type of Example 6.

Examples 7, 8

The thickness of the surface-treated layer 22 of Example 1 was changed to 5.0 μm and the other components were prepared in the same manner as Example 1 to obtain the light control sheet 10 of Example 7. Furthermore, as in Example 2, the pair of alignment layers 33 were added to the light control sheet 10 of Example 7 to obtain the light control sheet 10 of the reverse type of Example 8.

Examples 9, 10

The electrode layer 31 of Example 1 was changed to ITO having a thickness of 0.02 μm, the thickness of the surface-treated layer 22 of Example 1 was changed to 1.5 μm, and the other components were prepared in the same manner as Example 1 to obtain the light control sheet 10 of Example 9. Furthermore, as in Example 2, the pair of alignment layers 33 were added to the light control sheet 10 of Example 9 to obtain the light control sheet 10 of the reverse type of Example 10.

Examples 11, 12

The surface-treated layer 22 of Example 1 was changed to a diffusion prevention layer (acrylic resin) having a thickness of 1.0 μm and the other components were prepared in the same manner as Example 1 to obtain the light control sheet 10 of Example 11. Furthermore, as in Example 2, the pair of alignment layers 33 were added to the light control sheet 10 of Example 11 to obtain the light control sheet 10 of the reverse type of Example 12.

Examples 13, 14

The light control sheet 10 of Example 13 including the following layers was obtained. Furthermore, as in Example 2, the pair of alignment layers 33 were added to the light control sheet 10 of Example 13 to obtain the light control sheet 10 of the reverse type of Example 14.

Layer structure of light transmissive resin substrate 20: Second layer structure
    Light transmissive resin sheet 21: PEN sheet (manufactured by Teijin Limited)
    Thickness of light transmissive resin sheet 21: 50 μm
    Electrode layers 31: PEDOT
    Thickness of electrode layers 31: 0.3 μm Examples 15, 16

The light control sheet 10 of Example 15 including the following layers was obtained. Furthermore, as in Example 2, the pair of alignment layers 33 were added to the light control sheet 10 of Example 15 to obtain the light control sheet 10 of the reverse type of Example 16.

Layer structure of light transmissive resin substrate 20: Second layer structure
    Light transmissive resin sheet 21: PI sheet (manufactured by Kaneka Corporation)
    Thickness of light transmissive resin sheet 21: 50 μm
    Electrode layers 31: PEDOT
    Thickness of electrode layers 31: 0.3 μm Examples 17, 18

The light control sheet 10 of Example 17 including the following layers was obtained. Furthermore, as in Example 2, the pair of alignment layers 33 were added to the light control sheet 10 of Example 17 to obtain the light control sheet 10 of the reverse type of Example 18.

Layer structure of light transmissive resin substrate 20: Second layer structure
    Light transmissive resin sheet 21: PET sheet (manufactured by Toyobo Co., Ltd., A4300)
    Thickness of light transmissive resin sheet 21: 50 μm
    Electrode layers 31: PEDOT
    Thickness of electrode layers 31: 0.3 μm Comparative Examples 1, 2

The surface-treated layer 22 was omitted from the light control sheet 10 of Example 1 and the other components were prepared in the same manner as Example 1 to obtain a light control sheet of Comparative Example 1. Furthermore, as in Example 2, the pair of alignment layers 33 were added to the light control sheet of Comparative Example 1 to obtain a light control sheet 10 of the reverse type of Comparative Example 2.

In Examples 1 to 18 and Comparative Examples 1 and 2, a haze value of the light transmissive resin substrate 20 alone before and after being kept for 100 hours under conditions of 85° C. and 85% RH was measured by a method in accordance with JIS K 7136 (ISO 14782). Tables 1 and 2 show the haze value of the light transmissive resin substrate 20 alone before being kept under the above conditions, and an amount of increase in the haze value which is a difference between the haze value before and after keeping under the above conditions in Examples 1 to 18 and Comparative Examples 1 and 2.

In Examples 1 to 18 and Comparative Examples 1 and 2, a haze value of the electrode structure before and after being kept for 100 hours under conditions of 85° C. and 85% RH was measured by a method in accordance with JIS K 7136 (ISO 14782). Furthermore, the electrode structure was subjected to a bending resistance test by a method in accordance with JIS K5600-5-1 (bending resistance (cylindrical mandrel)). Tables 1 and 2 show the haze value of the electrode structure before being kept under the above conditions, and an amount of increase in the haze value which is a difference between the haze value before and after keeping under the above conditions in Examples 1 to 18 and Comparative Examples 1 and 2. Furthermore, Tables 1 and 2 show, as bendability, a minimum diameter of the mandrel that caused no cracks in the electrode structure in Examples 1 to 18 and Comparative Examples 1 and 2.

In Examples 1 to 18 and Comparative Examples 1 and 2, the light control sheets of the normal type were kept for 100 hours under conditions of 85° C. and 85% RH, and subsequently a voltage applied to the light control sheets was changed from 0 V to 10 V, and a minimum value of the haze value of the light control sheets was measured. The minimum value of the haze value was a value measured by a method in accordance with JIS K 7136 (ISO 14782) and was a minimum value of the haze value when a state of the light control layer was changed from the first state to the second state. Furthermore, a maximum value of a transmittance of the light control sheets from the first state to the second state was measured by a method in accordance with JIS K 7361-1 (ISO 13468-1). Tables 1 and 2 show the minimum value of the haze value and the maximum value of the transmittance of the light control sheets of the normal type in Examples 1 to 18 and Comparative Examples 1 and 2.

In Examples 1 to 18 and Comparative Examples 1 and 2, the light control sheets of the reverse type were kept for 100 hours under conditions of 85° C. and 85% RH, and subsequently a voltage applied to the light control sheets was changed from 0 V to 10 V, and a maximum value of the haze value of the light control sheets was measured. The maximum value of the haze value was a value measured by a method in accordance with JIS K 7136 (ISO 14782) and was a maximum value of the haze value when a state of the light control layer was changed from the first state to the second state. Furthermore, a minimum value of a transmittance of the light control sheets from the first state to the second state was measured by a method in accordance with JIS K 7361-1 (ISO 13468-1). Tables 1 and 2 show the maximum value of the haze value and the minimum value of the transmittance of the light control sheets of the reverse type in Examples 1 to 18 and Comparative Examples 1 and 2.

In Tables 1 and 2, "∘" indicates a level satisfying all of the following conditions, and "x" indicates a level not satisfying one or more of the following conditions.

The amount of increase in the haze value of the light transmissive resin sheet was less than 2%.
    Normal type: The minimum value of the haze value was 10% or less.
    Normal type: The maximum value of transmittance was 80% or more.
    Reverse type: The maximum value of the haze value was 80% or more.
    Reverse type: The minimum value of the transmittance was 10% or less.

TABLE 1

|  | Layer structure | Thickness (μm) of surface-treated layer | Haze value of light transmissive resin sheet | | Haze value of electrode structure | | Bendability of electrode structure Bendability (mm) | Haze value of light control sheet | | Transmittance of light control sheet | | Evaluation |
| --- | --- | --- | --- | --- | --- | --- | --- | --- | --- | --- | --- | --- |
|  |  |  | Before (%) | Amount of increase (%) | Before (%) | Amount of increase (%) |  | Minimum value (%) | Maximum value (%) | Minimum value (%) | Maximum value (%) |  |
| Example 1 | 1 | 0.2 | 0.7 | 2.6 | 0.6 | 0.5 | 0.8 | 9 | * | * | 85 | ○ |
| Example 2 | 1 | 0.2 | 0.7 | 2.6 | 0.7 | 0.5 | 0.8 | * | 85 | 9 | * | ○ |
| Example 3 | 1 | 1.5 | 0.7 | 2.6 | 0.6 | 0.0 | 1.6 | 7 | * | * | 87 | ○ |
| Example 4 | 1 | 1.5 | 0.7 | 2.6 | 0.7 | 0.0 | 1.6 | * | 88 | 7 | * | ○ |
| Example 5 | 1 | 3.0 | 0.7 | 2.6 | 0.6 | 0.0 | 2.5 | 7 | * | * | 87 | ○ |
| Example 6 | 1 | 3.0 | 0.7 | 2.6 | 0.7 | 0.0 | 2.5 | * | 88 | 7 | * | ○ |
| Example 7 | 1 | 5.0 | 0.7 | 2.6 | 0.6 | 0.0 | 4.0 | 7 | * | * | 87 | ○ |
| Example 8 | 1 | 5.0 | 0.7 | 2.6 | 0.7 | 0.0 | 4.0 | * | 88 | 7 | * | ○ |
| Comparative Example 1 | 2 | * | 0.7 | 2.6 | 0.6 | 3.0 | 0.4 | 12 | * | * | 87 | x |
| Comparative Example 2 | 2 | * | 0.7 | 2.6 | 0.7 | 3.0 | 0.4 | * | 78 | 15 | * | x |

TABLE 2

|  | Layer structure | Thickness (μm) of surface-treated layer | Haze value of light transmissive resin sheet | | Haze value of electrode structure | | Bendability of electrode structure Bendability (mm) | Haze value of light control sheet | | Transmittance of light control sheet | | Evaluation |
| --- | --- | --- | --- | --- | --- | --- | --- | --- | --- | --- | --- | --- |
|  |  |  | Before (%) | Amount of increase (%) | Before (%) | Amount of increase (%) |  | Minimum value (%) | Maximum value (%) | Minimum value (%) | Maximum value (%) |  |
| Example 9 | 1 | 1.5 | 0.7 | 2.6 | 0.6 | 0.0 | 3.5 | 7 | * | * | 87 | ○ |
| Example 10 | 1 | 1.5 | 0.7 | 2.6 | 0.7 | 0.0 | 3.5 | * | 88 | 7 | * | ○ |
| Example 11 | 1 | 1.0 | 0.7 | 2.6 | 0.6 | 1.9 | 0.4 | 9 | * | * | 85 | ○ |
| Example 12 | 1 | 1.0 | 0.7 | 2.6 | 0.7 | 1.9 | 0.4 | * | 85 | 9 | * | ○ |
| Example 13 | 2 | * | 0.7 | 0.8 | 0.6 | 0.9 | 0.4 | 9 | * | * | 85 | ○ |
| Example 14 | 2 | * | 0.7 | 0.8 | 0.6 | 0.9 | 0.4 | * | 85 | 9 | * | ○ |
| Example 15 | 2 | * | 0.1 | 0.2 | 1.0 | 0.2 | 0.4 | 8 | * | * | 82 | ○ |
| Example 16 | 2 | * | 0.1 | 0.2 | 1.0 | 0.2 | 0.4 | * | 82 | 8 | * | ○ |
| Example 17 | 2 | * | 0.7 | 1.9 | 0.6 | 1.9 | 0.4 | 8 | * | * | 87 | ○ |
| Example 18 | 2 | * | 0.7 | 1.9 | 0.6 | 1.9 | 0.4 | * | 87 | 8 | * | ○ |
| Comparative Example 1 | 2 | * | 0.7 | 2.6 | 0.6 | 3.0 | 0.4 | 12 | * | * | 79 | x |
| Comparative Example 2 | 2 | * | 0.7 | 2.6 | 0.7 | 3.0 | 0.4 | * | 78 | 15 | * | x |

As shown in Tables 1 and 2, it was observed that in the electrode structures of Examples 1 to 18, the amount of increase in the haze value was in the range of 0.0% or more and 1.9% or less and all of the levels satisfied Condition 1. On the other hand, it was observed that in the electrode structures of Comparative Examples 1 and 2, the amount of increase in the haze value was 3.0% and neither of the levels satisfied Condition 1. Furthermore, it was observed that in the light transmissive resin sheets of Example 13 to 18, the amount of increase in the haze value was in the range of 0.2% or more and 1.9% or less and all of the levels satisfied Condition 2.

It was observed that in the light control sheets of the normal type in Examples 1 to 18, the minimum value of the haze value was in the range of 7% or more and 9% or less, and thus the minimum value of the haze value was 10% or less at which the light control sheets had sufficient resistance in a high-temperature and high-humidity environment. Furthermore, it was observed that in the light control sheets of the reverse type in Examples 1 to 18, the maximum value of the haze value was in the range of 82% or more and 88% or less, and thus the maximum value of the haze value was 80% or more at which the light control sheets had sufficient resistance in a high-temperature and high-humidity environment.

It was observed that in the light control sheets of the normal type in Examples 1 to 18, the maximum value of the transmittance was in the range of 82% or more and 87% or less, and thus the maximum value of the transmittance was 80% or more at which the light control sheets had sufficient resistance in a high-temperature and high-humidity environment. Furthermore, it was observed that in the light control sheets of the reverse type in Examples 1 to 18, the minimum value of the transmittance was in the range of 7% or more and 9% or less, and thus the minimum value of the transmittance was 10% or less at which the light control sheets had sufficient resistance in a high-temperature and high-humidity environment.

On the other hand, it was observed that in the light control sheet of Comparative Example 1, the minimum value of the haze value was 12% and the maximum value of the transmittance was 87%, and thus from the viewpoint of the haze value, the light control sheet of Comparative Example 1 did not have sufficient resistance in a high-temperature and high-humidity environment. Furthermore, it was observed that in the light control sheet of Comparative Example 2, the maximum value of the haze value was 78% and the minimum value of the transmittance was 15%, and thus from the viewpoints of both the haze value and the transmittance, the light control sheet of Comparative Example 2 did not have sufficient resistance in a high-temperature and high-humidity environment.

That is, when a hard coat layer is included as the surface-treated layer 22 (Examples 1 to 10), even if the light transmissive resin sheet 21 releases low-molecular weight impurities, sufficient reliability of alignment control using the liquid crystal molecules can be ensured.

When a diffusion prevention layer is included as the surface-treated layer 22 (Example 11 to 12) or when <Condition 1> is satisfied (Examples 1 to 18), sufficient reliability of alignment control using the liquid crystal molecules can also be ensured. Furthermore, when <Condition 2> is satisfied (Example 13 to 18), while the surface-treated layer 22 is omitted, sufficient reliability of alignment control using the liquid crystal molecules can also be ensured.

It was also observed that the electrode structures of Examples 1 to 18 had a bendability in the range of 0.4 mm or more and 4 mm or less, and thus the light control sheet was deformable according to a shape of an object to which the light control sheet was to be applied.

As described above, the above embodiment achieves effects listed below.

(1) When the light control sheet includes the surface-treated layer 22, diffusion of the low-molecular weight impurities and generation of the low-molecular weight impurities in the light transmissive resin sheet 21 can be prevented. Thus, reliability of alignment control in a high-temperature and high-humidity environment can be increased.

(2) When the surface-treated layer 22 is located on the first surface 211, it is possible to stop the low-molecular weight impurities just before they reach the light control layer 30.

(3) When the surface-treated layer 22 is located on the second surface 212, generation itself of the low-molecular weight impurities due to hydrolysis or the like in the light transmissive resin sheet 21 can be prevented.

(4) When the surface-treated layer 22 is a cured product of a photocurable resin or a cured product of a thermosetting resin, energy for curing the curable resin can be supplied through the light transmissive resin sheet 21.

(5) When the surface-treated layer 22 also has a function of bonding the light transmissive resin sheet 21 to the light control layer 30, adhesion between the light transmissive resin sheet 21 and the light control layer 30 can be increased.

(6) The electrode structure shows the amount of increase of less than 2% in the haze value after being kept for 100 hours under conditions of 85° C. and 85% RH, and thus diffusion of the low-molecular weight impurities to the light control layer 30 and generation of the low-molecular weight impurities can be prevented.

(7) When the light transmissive resin sheet 21 shows the amount of increase of less than 2% in the haze value after being kept for 100 hours under conditions of 85° C. and 85% RH, an effect similar to the effect (6) can be enhanced, and the surface-treated layer 22 can be omitted.

(8) As compared with a conductive metal oxide, the electrode layer 31 composed of a conductive polymer is typically more likely to allow the low-molecular weight impurities to pass through, but has good flexibility. Therefore, when the electrode layer 31 is composed of a conductive polymer, reliability of alignment control in a high-temperature and high-humidity environment can be increased, and the light control sheet 10 having good flexibility can be provided.

The foregoing embodiment may be appropriately modified and implemented as follows.

<Liquid Crystal Layer 32>

The type of the liquid crystal layer 32 may be changed to a polymer dispersed liquid crystal (PDLC) or a nematic curvilinear aligned phase (NCAP). Polymer dispersed liquid crystals have a large number of isolated voids in a polymer layer, and hold a liquid crystal composition in each of the voids dispersed in the polymer layer. Nematic curvilinear aligned phases hold an encapsulated liquid crystal composition in a polymer layer.

<Layer Structure of Light Control Sheet>

One of the light transmissive resin substrates 20 of the light control sheet may have a structure similar to the first layer structure described above, and the other light transmissive resin substrate may have a structure similar to the second layer structure described above. That is, one of the light transmissive resin substrates 20 may include the surface-treated layer 22, and the other light transmissive resin substrate 20 may be composed of only the light transmissive resin sheet 21 satisfying Condition 2.

The present application addresses the following. In recent years, the objects to which the light control sheets are applied have been extended to windows of aircraft, light projection devices of automobiles, windows of automobiles, and the like, and the environment where the light control sheets are placed has also been extended to a space where temperature and humidity vary greatly. Therefore, there is an increasing demand for increasing resistance of the light control sheets to such a new environment. In particular, in a high-temperature and high-humidity environment, as a new problem, a phenomenon occurs in which an alignment direction of the liquid crystal molecules is less likely to follow the application of a voltage.

An aspect of the present invention is to provide a light control sheet capable of increasing reliability of alignment control in a high-temperature and high-humidity environment, and a light control device including the light control sheet.

A light control sheet includes a light transmissive resin substrate and a light control layer that is supported by the light transmissive resin substrate. The light control layer includes a liquid crystal layer and a pair of electrode layers that sandwich the liquid crystal layer. The light transmissive resin substrate includes a light transmissive resin sheet and a surface-treated layer, the light transmissive resin sheet has a first surface that faces the light control layer and a second surface which is a surface opposite to the first surface, and the surface-treated layer is located on at least one of the first surface and the second surface and has a barrier property.

A light control sheet includes a light transmissive resin substrate and a light control layer that is supported by the light transmissive resin substrate. The light control layer includes a liquid crystal layer and electrode layers that sandwich the liquid crystal layer. In a structure composed of the electrode layers and the light transmissive resin substrate bonded to the electrode layers, a rate of increase in haze value after the structure is kept for 100 hours under conditions of a temperature of 85° C. and a relative humidity of 85% is less than 2%.

A light control device includes the light control sheet and a voltage control unit that controls application of a drive voltage to the electrode layers of the light control sheet.

What is claimed is:

1. A light control sheet, comprising:
a light transmissive resin substrate; and
a light control layer formed on the light transmissive resin substrate,
wherein the light control layer includes a liquid crystal layer and a pair of electrode layers sandwiching the liquid crystal layer, the light transmissive resin substrate includes a light transmissive resin sheet and a plurality of surface-treated layers having a barrier property such that the light transmissive resin sheet has a first surface facing the light control layer and a second surface opposite to the first surface and that the plurality of surface-treated layers includes a first surface-treated layer formed on the first surface of the light transmissive resin sheet and a second surface-treated layer formed on the second surface of the light transmissive resin sheet, the light transmissive resin substrate is bonded to a surface of the light control layer such that the first surface-treated layer is interposed between the light control layer and the light transmissive resin sheet and prevents diffusion of low-molecular weight impurities into the light control layer, each of the first and second surface-treated layers includes at least one of a hard coat layer and a diffusion prevention layer, and the electrode layers and the light transmissive resin substrate form a structure in which an amount of increase in haze value after the structure is kept for 100 hours at a temperature of 85° C. and a relative humidity of 85% is less than 2%.

2. The light control sheet according to claim 1, wherein each of the first and second surface-treated layers is the hard coat layer.

3. The light control sheet according to claim 2, wherein the hard coat layer is a cured product of a photocurable resin or a cured product of a thermosetting resin.

4. The light control sheet according to claim 2, wherein the light transmissive resin substrate includes the light transmissive resin sheet comprising polyethylene naphthalate or polyimide.

5. The light control sheet according to claim 1, wherein each of the first and second surface-treated layers is the diffusion prevention layer that prevents diffusion of low-molecular weight impurities from the light transmissive resin sheet.

6. The light control sheet according to claim 5, wherein the diffusion prevention layer is a crosslinked product of a composition including at least one polymer selected from the group consisting of an acrylic polymer, a polyester, a polyurethane, and a polyvinyl alcohol, and the at least one polymer has a functional group that forms a crosslinked structure.

7. The light control sheet according to claim 5, wherein the light transmissive resin substrate includes the light transmissive resin sheet comprising polyethylene naphthalate or polyimide.

8. The light control sheet according to claim 1, wherein each of the electrode layers comprises a conductive polymer.

9. The light control sheet according to claim 1, wherein the liquid crystal layer includes a polymer network having a plurality of domains each filled with a liquid crystal composition.

10. A light control device, comprising:
the light control sheet of claim 1; and
a voltage controller configured to control application of a drive voltage to the electrode layers of the light control sheet.

11. The light control sheet according to claim 1, wherein each of the first and second surface-treated layers includes the hard coat layer, and the hard coat layer is a cured product of a photocurable resin or a cured product of a thermosetting resin.

12. The light control sheet according to claim 1, wherein each of the first and second surface-treated layers includes the diffusion prevention layer, and the diffusion prevention layer is a crosslinked product of a composition including at least one polymer selected from the group consisting of an acrylic polymer, a polyester, a polyurethane, and a polyvinyl alcohol, and the at least one polymer has a functional group that forms a crosslinked structure.

13. The light control sheet according to claim 1, wherein the light transmissive resin substrate includes the light transmissive resin sheet comprising polyethylene naphthalate or polyimide.

14. A light control sheet, comprising:
a light transmissive resin substrate; and
a light control layer formed on the light transmissive resin substrate,
wherein the light control layer includes a liquid crystal layer and a plurality of electrode layers sandwiching the liquid crystal layer, and the light transmissive resin substrate includes a light transmissive resin sheet comprising polyethylene naphthalate or polyimide and directly contacting one of the electrode layers such that the electrode layers and the light transmissive resin substrate form a structure in which an amount of increase in haze value after the structure is kept for 100 hours at a temperature of 85° C. and a relative humidity of 85% is less than 2%.

15. The light control sheet according to claim 14, wherein the light transmissive resin substrate includes the light transmissive resin sheet and a surface-treated layer having a barrier property such that the light transmissive resin sheet has a first surface facing the light control layer and a second surface opposite to the first surface and that the surface-treated layer is formed on the first surface, and the light transmissive resin substrate is bonded to a surface of the light control layer such that the surface-treated layer is interposed between the light control layer and the light transmissive resin sheet and prevents diffusion of low-molecular weight impurities into the light control layer.

16. The light control sheet according to claim 15, wherein the light transmissive resin substrate exhibits an increase of less than 2% in haze value after being kept for 100 hours at a temperature of 85° C. and a relative humidity of 85%.

17. The light control sheet according to claim 15, wherein the light transmissive resin substrate includes a second surface-treated layer formed on the second surface of the light transmissive resin sheet.

18. The light control sheet according to claim 14, wherein the light transmissive resin substrate exhibits an increase of less than 2% in haze value after being kept for 100 hours at a temperature of 85° C. and a relative humidity of 85%.

19. The light control sheet according to claim 14, wherein the light transmissive resin substrate is a polyethylene naphthalate sheet.

20. The light control sheet according to claim 14, wherein the light transmissive resin substrate is a polyimide sheet.

* * * * *